Feb. 15, 1938.   A. A. SCHRAMM ET AL   2,108,180
BRAKE
Filed Sept. 14, 1934
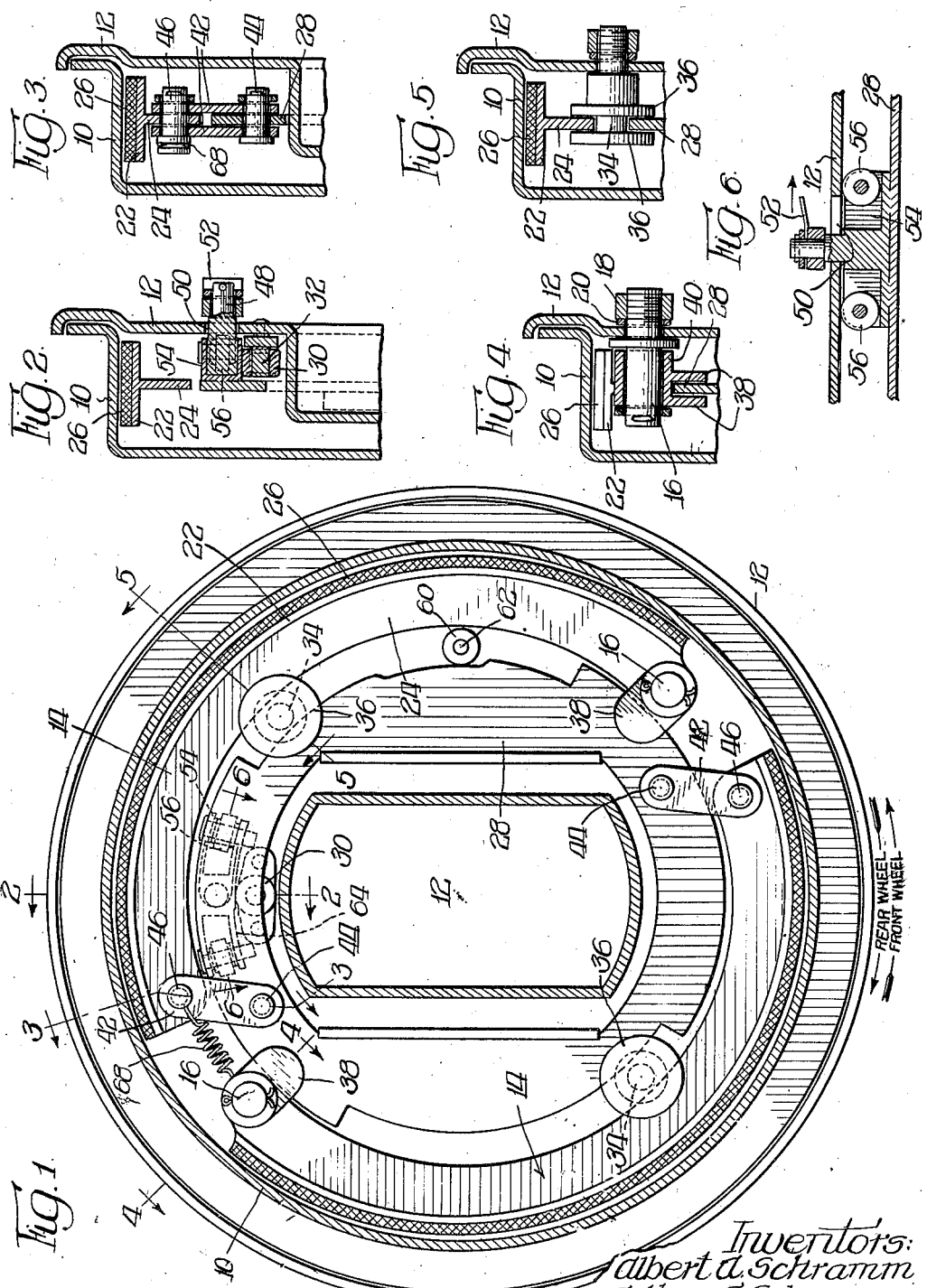
Inventors:
Albert A. Schramm
Arthur A. Schramm
By Wilkinson, Huxley, Byron & Knight  Attys Patented Feb. 15, 1938

2,108,180

UNITED STATES PATENT OFFICE 2,108,180

BRAKE

Albert A. Schramm and Arthur A. Schramm, Chicago, Ill.

Application September 14, 1934, Serial No. 743,935

11 Claims. (Cl. 188—78)

This invention relates to brakes, and has been illustrated as embodied in a brake suitable for automobiles. In the preferred form illustrated, the brake comprises a pair of shoes each pivotally anchored at one end, preferably extending in the same circumferential direction and each actuated at the other end by means of a floating ring which may be connected to each shoe by a single toggle link. The ring is of course actuated in any desired manner, as by a cable connected to the foot pedal of the vehicle.

Although the art relating to brakes is already crowded, with patents, the problem of providing an efficient brake which does not require adjustment or which requires a minimum of adjustment and which sufficiently maintains its efficiency during its normal wear has not heretofore been solved. This is especially true as to simple brake mechanisms which can be cheaply manufactured. It is therefore an object of the present invention to provide a brake which solves the above mentioned problem in an economical and practical manner.

It is a further object to provide a brake in which the pressure action and wear on the two shoes are substantially equal, with the attendant advantages that the braking effort is equally distributed on the two shoes, and that the same lining may be used on the two shoes satisfactorily.

The invention has an additional advantage of providing a brake in which the location of the anchor pivots, the rigidity and length of shoes, and the manner of actuation are such as to prevent locking regardless of the amount the lining has been worn, while at the same time providing a sufficient braking force with a minimum of application pressure, the ratio of braking force to pedal pressure increasing slightly as the brake is applied.

With these and various other objects in view, the invention may consist of certain novel features of construction and operation, as will be more fully described and particularly pointed out in the specification, drawing and claims appended hereto.

In the drawing, which illustrates an embodiment of the device, and wherein like reference characters are used to designate like parts, Figure 1 is an elevational view of a brake within the brake drum;

Figure 2 is a fragmentary sectional view taken through the line 2—2 of Figure 1;

Figure 3 is a fragmentary view taken through the line 3—3 of Figure 1;

Figure 4 is a fragmentary view taken through the line 4—4 of Figure 1;

Figure 5 is a fragmentary view taken through the line 5—5 of Figure 1; and

Figure 6 is a fragmentary circumferential view taken through the line 6—6 of Figure 1.

Although my invention may take many forms, only one has been chosen for illustration. On automobiles the brake will be used in combination with a brake drum 10 which forms the rotating part of the wheel, and a dust plate 12 which is rigidly anchored against rotation. The brake comprises a pair of shoes 14 each of which is pivoted to an anchored pin 16 securely fastened to the dust plate 12 in any manner, such as by the nut 18 and lock washer 20. Each brake shoe includes the arcuate pressure plate 22 and the backing rib 24, together with a suitable lining 26 secured to the pressure plate in any desired manner. The pressure plate 22 has a radius such that the outer surface of the lining 26 has the same curvature as the inside of the drum 10. For various reasons the approximate proportioning of the parts as shown is preferred, although of course this is not essential. Of course with any given lining and any size of brake shoe used the anchor pin 16 should be close enough to the brake drum to prevent locking while at the same time far enough away to insure efficient braking. Between the two brake shoes 14 is a ring 28 which during application of the brakes is a floating ring, but which when the brakes are released may rest on a roller 30 carried by a pin 32 secured to the anchor plate, as shown in Figure 2. The floating ring 28 may also be guided and have its movement limited by studs 34 and by the ribs 24. Each stud 34 is circular in shape and provided with circular flanges 36 which prevent undue axial movement of the ring 28. Axial movement of this ring at two other points is prevented by flanges 38 on the brake shoes. Although these flanges have been shown as integral extensions of the brake shoe bearing 40, it should be realized that they may be secured to the rib 24 or to the anchor bearing 40 in any convenient manner, as by spot welding. Likewise it may be mentioned at this time that the pressure plate 22 and rib 24 may be integral or may be joined as by welding.

The floating ring 28 is connected to each shoe 14 as by links 42, each of which is pivoted to the ring as by a pivot pin 44, and to the shoe as by a pivot pin 46. By varying the positions of these pivots 44 and 46 the ratio of force applied to the rim, to the effective force applied to the shoe may be controlled. With the other constants as shown, the positions of the pivot pins 44 and 46 as shown is desirable.

The ring may be rotated either by a cable or other member extending through the dust plate 12 and secured to the ring or preferably by a pin 48 welded or otherwise secured to the ring 28 and extending through a slot 50 in the dust plate 12. To the pin 48 will of course be attached a cable or link 52 as indicated more or less diagrammatically in Figure 6, or it may be operated in any other manner. The pin 48 is preferably reinforced by flanges 54 between which may be mounted rollers 56, as best shown in Figures 1, 2, and 6. These rollers, of course, may be omitted or additional anti-frictional rollers may be put in at any point desired. The cable 52 or other operating means should act on the ring in a direction to exert even pressure on the two brake shoes, and a thrust member such as the roller 60 should be mounted on the dust plate 12 as by a stud 62, at such position as to react on the ring in a manner to keep the forces exerted by the two shoes equal. There are probably a variety of positions which would be satisfactory for the roller 60 if the application of force to the ring by the cable 52 is correspondingly changed so that the net resultant of the force applied to the ring by the cable together with the reaction of the roller 60 on the ring will operate equally on the two shoes and any such arrangement will be satisfactory. To insure that an equal force is applied to the two shoes under a variety of circumstances, it is preferred that the thrust roller 60 be located at such position that the ring 28 may float freely in either direction of application of force through the links 42. The position shown is sufficiently close for this purpose. It should be obvious that if both the thrust of the roller 60 and the force of application of the cable 52 are perpendicular to the direction of force applied by the ring to the shoes, and if there are no other external forces effecting the ring, the ring must act equally on the shoes in opposite directions.

In connection with the free floating action of the ring in the direction of force applied to the shoes, it should be noted that the roller 30 is located low enough so that with the ring 28 resting on the roller 30 while the brake is fully released, the lower shoe 14 is slightly closer to the brake drum than is the upper shoe, although this difference, being preferably small, has not been illustrated. The result is that the lower shoe 14 touches the drum first, and thereupon a continued rotation of the ring 28 actuates the upper shoe 14 without putting any material pressure on the lower shoe 14, until the upper shoe also touches the drum. As soon as the lower shoe touches the drum, further rotation of the ring not only actuates the upper shoe, but also raises the ring itself off of the roller 30 so that the ring is thereafter freely floating in its force-applying direction, i. e., the direction in which the links 42 extend. In order to increase the possible floating movement of the ring 28, the flange 54 which rests on the roller 30 when the brake is in released position may be recessed at 64 so as to be widely removed from the roller 30 when the ring is turned far enough to apply the upper shoe 14 to the drum.

Although no adjustments have been provided, and it is believed none is necessary, the usual adjustments may be provided if desired, and the stud 62 may be adjustable so as to permit accurate placing of the ring 28 in such position that the links 42 assume corresponding positions so as to act equally on the two shoes. If only one release spring is used, it may be used for example in the position of spring 68, being attached to an anchor 16 for one shoe, and to the pin 46 for the other shoe.

The operation of the brake is for the most part apparent from the drawing. When the cable or link 52 is drawn in the direction indicated by the arrow in Figure 6, the floating ring 28 is rotated clockwise, as seen in Figure 1, thereby rotating the brake shoes 14 on their pivot anchors 16 until one or both contacts the brake drum 10.

Because the ring 28 has up to this time been resting on the roller 30, the lower shoe 14 will normally engage the drum first, but as soon as any pressure is applied, the reaction of this application of pressure will cause the ring 28 to raise off of the roller 30 and press the upper shoe 14 against the brake drum. The ring 28 will then be suspended as a floating ring between two shoes, thereby insuring a substantially equal pressure on the two shoes.

Although it is not necessary to give theories of operation, and although the following theory may not prove to be true, it is mentioned for the sake of pointing out an apparent advantage which could not otherwise be made clear. As in all brakes, friction of the shoe with the wheel when the wheel is rotating in a direction from the free end of the shoe toward the anchored end of the shoe tends to apply the brake. In the present brake there is normally a greater radial movement of the shoe at about the central portion of the shoe, and this portion might be expected to get the greatest pressure in braking. However, because of the relative position of the pins 44 and 46 the application of pressure by the ring tends to spread each shoe unit (i. e., shoe and band) into an arc having a greater radius, and although this spreading effect is kept within safe bounds by the rib 24, there is nevertheless some slight elasticity which tends to even up the pressure on the two parts of the brake shoe. Furthermore, since the greatest radial movement is at a point where the braking friction has only a slight component in the brake applying direction, locking of the brakes is apparently absolutely prevented. At the same time, the length of the shoe, together with the direction in which the force is applied thereto, seem to result in a minute expansion of the shoe, which enables its free end to press on the drum with enough force to transfer as much braking friction as may be desired into brake applying force. Of course, the shoes should be stiff enough to prevent locking.

It will be noted that the brake is more effective with a given pedal pressure in one direction of wheel rotation than in the other. If the brakes on all wheels are alike, the effective direction should be forward, i. e., a clockwise rotation for the wheel shown in Figure 1 should be forward. However, the differential efficiency may be utilized by reversing the front brakes so that as indicated by the arrow marked "front wheel" in Figure 1, the forward rotation of the front wheels will be in the direction of less effective braking. This at once tends to make the total braking the same for forward and reverse movements of the vehicle, and makes the front wheel braking weaker than the rear wheel braking for forward movements when front wheel skidding would otherwise be likely to occur.

It is to be understood that many other embodiments of the invention, including some in improved form, will be apparent, and in the course of time more will be devised by those skilled in the art. It is not desired that this invention be limited to the details described, for its scope includes all such forms or improvements as come within the spirit of the following claims, construed as broadly as the prior art will permit.

What is claimed is:

1. A brake including: a brake support; a pair of identical brake shoes pivotably anchored to said support at widely spaced points and extending in the same circumferential direction from said points; and means for applying said shoes against the drum including: an applicator member, means for operating said applicator member by rotating it about a point between the free ends of said shoes, and a link extending in the same circumferential direction and inwardly from the free end of each shoe to a point on said applicator member which approaches the original position of the point of engagement of said link with said shoe as said applicator member is operated, the links for the two shoes being identical in nature, and the applicator member being substantially freely floating in the plane of its operation when in its operated position whereby the pressure on the two shoes is substantially equalized; and means for limiting the movement of said applicator member in the direction of its thrust on a brake shoe when the forces exerted thereon are out of balance.

2. A brake including: a brake support, a pair of identical brake shoes pivotably anchored to said support at widely spaced points, and extending in the same circumferential direction from said points; and means engaging said applicator member at a single point for applying said shoes against the drum including: an applicator member, means for operating said applicator member by rotating it about a point between the free ends of said shoes, a link extending in the same circumferential direction and inwardly from the free end of each shoe to a point on said applicator member which approaches the original position of the point of engagement of said link with said shoe as said applicator member is operated, the links for the two shoes being identical in nature, and the applicator member being substantially freely floating in the plane of its operation when in its operated position whereby the pressure on the two shoes is substantially equalized; and means for limiting the movement of said applicator member when the forces exerted thereon are out of balance, and for confining its movements to movements in its operating plane.

3. A brake including: a brake support, a pair of shoes each having one free end and one end anchored to said support; means for applying said shoes to a brake drum including: an applicator member, means engaging said applicator member at a single point for operating said applicator member by rotating it about a point between the free ends of said shoes, a link extending between the free end of each shoe and a point on said applicator member which approaches the original position of the point of engagement of said link with said shoe as said applicator member is operated, the links for the two shoes being identical in nature, and the applicator member being substantially freely floating in the plane of its operation when in its operated position and having not more than one point of engagement at which thrust is transmitted to each shoe whereby the pressure on the two shoes is substantially equalized; and means for limiting the movement of said applicator member when the forces exerted thereon are out of balance.

4. A brake including: a brake support, a pair of shoes each having one free end and one end anchored to said support; means for applying said shoes to a brake drum including: an applicator member, means engaging said applicator member at a single point for operating said applicator member by rotating it about a point between the free ends of said shoes, and a link extending between the free end of each shoe and a point on said applicator member which approaches the original position of the point of engagement of said link with said shoe as said applicator member is operated, the links for the two shoes being identical in nature, and the applicator member being substantially freely floating in the plane of its operation when in its operated position and having not more than one point of engagement at which thrust is transmitted to each shoe whereby the pressure on the two shoes is substantially equalized; and means for limiting the movement of said applicator member when the forces exerted thereon are out of balance and for confining its movements to movements in its operating plane.

5. A brake including: a brake support, a pair of shoes each having one free end and one end anchored to said support; means for applying said shoes to a brake drum including: an applicator ring, operating means engaging said applicator ring at a point near its periphery and tending to draw said point in a substantially tangent direction with respect to a center point which is substantially mid-way between the free ends of said shoes, and a link extending between the free end of each shoe and a point on said applicator ring which approaches the original position of the point of engagement of said link with said shoe as said applicator ring is operated, the links of the two shoes being identical in nature, and the applicator ring being substantially freely floating in the plane of its operation when in its operated position whereby the pressure on the two shoes is substantially equalized; and means for limiting the movement of said applicator ring when the forces exerted thereon are out of balance and for confining its movements to movements in its operating plane; said movement limiting means including a thrust member positioned on the side of said ring toward which said operating means moves said ring, but engaging an arcuate portion of said ring having its center substantially coinciding with said center point; the direction of application of force by said operating means to said ring, and the direction of reaction of said thrust member on said ring both being substantially perpendicular to the direction of application of force by said ring through said links to said shoes.

6. A brake including: a brake support, a pair of shoes each having one free end and one end anchored to said support; means for applying said shoes to a brake drum including: an applicator ring, operating means engaging said applicator ring at a point near its periphery and tending to draw said point in a substantially tangent direction with respect to a center point which is substantially mid-way between the free ends of said shoes, and a link extending between the free end of each shoe and a point on said applicator ring which approaches the original position of the point of engagement of said link with said shoe as said applicator ring is operated, the links for the two shoes being identical in nature, and the applicator ring being substantially freely floating in the plane of its operation when in its operated position whereby the pressure on the two shoes is substantially equalized; and means for limiting the movement of said applicator ring when the forces exerted thereon are out of balance and for confining its movements to movements in its operating plane; said movement limiting means including a thrust member positioned on the side of said ring toward which said operating means moves said ring, but engaging an arcuate portion of said ring having its center substantially coinciding with said center point.

7. A brake including: a brake support, a pair of shoes each having one free end and one end anchored to said support; means for applying said shoes to a brake drum including: an applicator ring, operating means engaging said applicator ring at a point near its periphery and tending to draw said point in a substantially tangent direction with respect to a center point which is substantially mid-way between the free ends of said shoes, and a link extending between the free end of each shoe and a point on said applicator ring which approaches the original position of the point of engagement of said link with said shoe as said applicator ring is operated, the links of the two shoes being identical in nature, and the applicator ring being substantially freely floating in the plane of its operation during a portion of the brake-applying movement whereby the pressure on the two shoes is substantially equalized; and a thrust member positioned on the side of said ring toward which said operating means moves said ring, but engaging an arcuate portion of said ring having its center substantially coinciding with said center point; the direction of application of force by said operating means to said ring, and the direction of reaction of said thrust member on said ring both being substantially perpendicular to the direction of application of force by said ring through said links to said shoes.

8. A brake including a brake support, a pair of shoes each having one free end and one end anchored to said support; means for applying said shoes to a brake drum including an applicator ring acting in like manner on the free end of each shoe, operating means engaging said applicator ring at a point near its periphery and tending to draw said point in a substantially tangent direction with respect to a center point which is substantially midway between the free ends of said shoes, the applicator ring being substantially freely floating in the plane of its operation and in the direction of thrust on the brake shoes during a portion of the brake-applying movement whereby the pressure on the two shoes is substantially equalized; and a thrust member positioned on the side of said ring toward which said operating means moves said ring, but engaging an arcuate portion of said ring having its center substantially coinciding with said center point; the direction of application of force by said operating means to said ring, and the direction of reaction of said thrust member on said ring both being substantially perpendicular to the direction of application of force by said ring through said links to said shoes.

9. A brake including a brake support, a pair of shoes each having one free end and one end anchored to said support; means for applying said shoes to a brake drum including an applicator ring, acting in like manner on the free end of each shoe, operating means engaging said applicator ring at a point near its periphery and tending to draw said point in a substantially tangent direction with respect to a center point which is substantially midway between the free ends of said shoe, the applicator ring being substantially freely floating in the plane of its operation and direction of thrust on the brake shoes during a portion of the brake-applying movement whereby the pressure on the two shoes is substantially equalized; and a thrust member so positioned that the direction of application of force by said operating means to said ring and the direction of reaction of said thrust member on said ring both are so related that said operating means and said thrust member exert substantially no net force on said ring in the direction of thrust on the brake shoe whereby the forces exerted on the shoes are reliably equalized.

10. A brake including a brake support, a pair of shoes each having one free end and one end anchored to said support; means for applying said shoes to a brake drum including an applicator ring acting in like manner on the free end of each shoe, operating means engaging said applicator ring at a point near its periphery and tending to draw said point in a substantially tangent direction with respect to a center point which is substantially midway between the free ends of said shoe, the applicator ring being substantially freely floating in the plane of its operation and direction of thrust on the brake shoes during a portion of the brake-applying movement whereby the pressure on the two shoes is substantially equalized; and a thrust member so positioned that the direction of application of force by said operating means to said ring and the direction of reaction of said thrust member on said ring both are so related that said operating means and said thrust member exert substantially no net force on said ring in the direction of thrust on the brake shoe whereby the forces exerted on the shoes are reliably equalized, and a roller for supporting said ring when said brake is at rest, said roller operating on a surface of said ring which permits free rotation of said ring.

11. A brake including a brake support, a pair of substantially rigid brake shoes pivotably anchored to said support at widely spaced points and extending in the same circumferential direction from said points, and floating means for applying substantially equal pressure to the free ends of both of said shoes to apply them against the drum, whereby equality of braking action of the two shoes is assured, and a pin carried by and connected directly to said floating means at a single point thereon extending through said support and connected to the external brake rigging for actuating said floating means.

ALBERT A. SCHRAMM.
ARTHUR A. SCHRAMM.